United States Patent Office 2,740,804
Patented Apr. 3, 1956

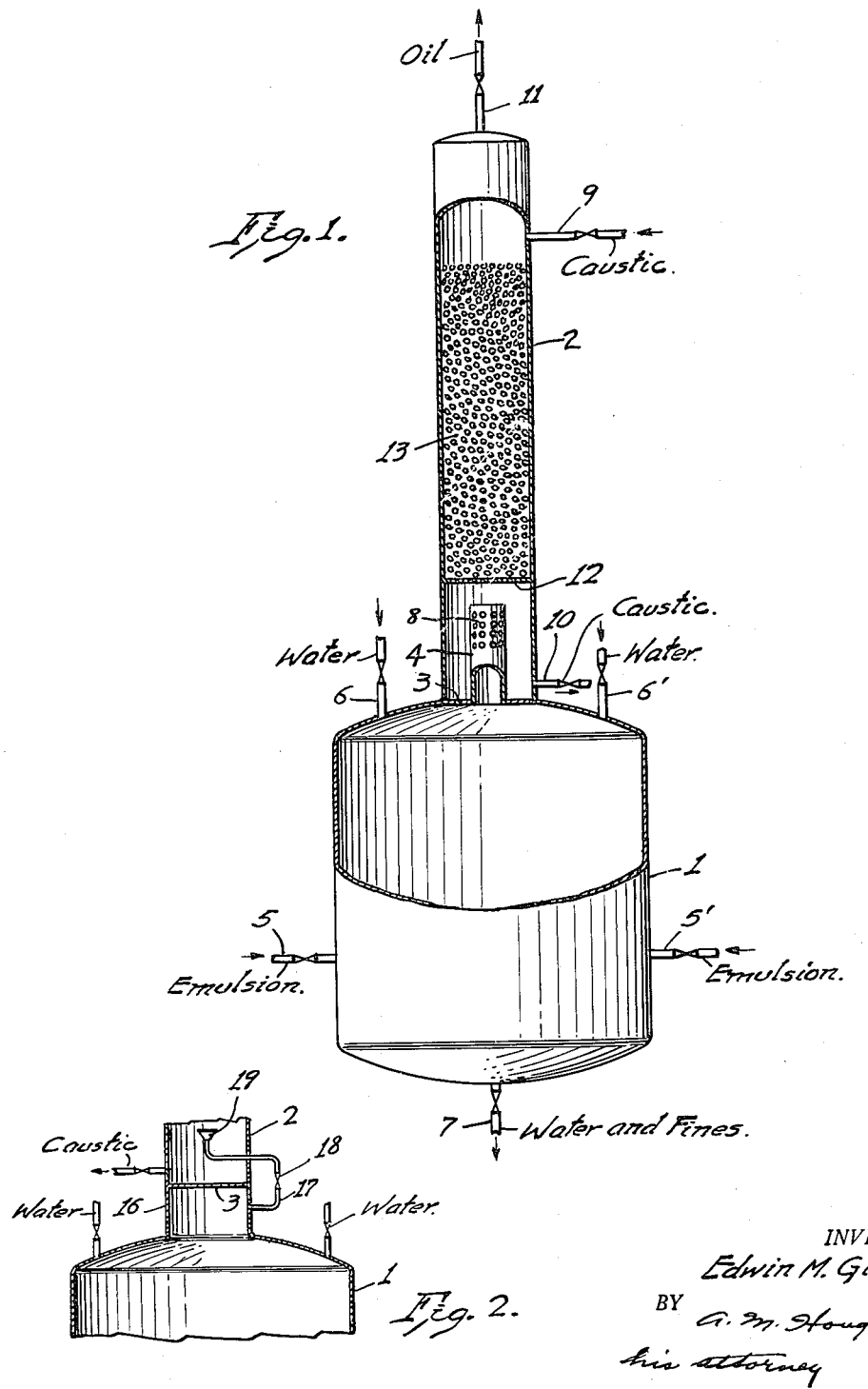
INVENTOR.
Edwin M. Glazier.
BY

2,740,804

PROCESS FOR SEPARATING WATER-OIL MIXTURES CONTAINING FINE SOLIDS

Edwin M. Glazier, Verona, Pa., assignor to Gulf Research & Development Company, Pittsburgh, Pa., a corporation of Delaware Application August 28, 1951, Serial No. 244,051

2 Claims. (Cl. 260—450)

This invention relates to an apparatus and process for separating materials and more particularly to an apparatus and process for separating the constituents of a water-oil mixture containing fine solid material.

In fluid catalyst processes it is customary to separate the gaseous product from fine solid catalyst particles suspended therein by separating means such as cyclone separators. These separators remove the bulk of the catalyst particles from the product but there usually remains a small amount of catalyst fines in the product which must be removed in some other way. The reactor effluent in the fluid catalyst Fischer-Tropsch process is a gaseous mixture of hydrocarbons, water vapor, and oxygenated organic compounds having suspended therein solid catalyst fines which cannot be entirely removed in the cyclone separators.

The condensed reactor effluent usually will comprise an oil phase, an emulsion, a water phase, and dispersed solid catalyst fines. The oil and water layers can be separated from the condensate as by decanting, but a serious separation problem is presented by the emulsion. This emulsion appears to be stabilized by the dispersed catalyst fines and by other substances in the product and will separate only very slowly on standing.

It might be possible to remove the solid fines by scrubbing the total reactor effluent before condensing it. However, this would require a very large and expensive scrubber operating at essentially reaction pressure and high temperatures and means such as a high pressure filter would have to be provided to remove catalyst fines from the scrubbing medium. Moreover, the scrubber could only separating solids from gases so that the scrubbed gaseous product after being condensed, although free of solids, would still contain a mixture of hydrocarbons, water and oxygenated products which usually would form a difficultly separable emulsion that would have to be treated in additional equipment to break the emulsion.

The equipment requirements of the prior art method of separation would not be diminished appreciably by filtering the condensed reactor effluent, for the reason that a filter of excessively large capacity would be required to handle the entire product. Also the filtrate would contain the water-oil emulsion so that further equipment to separate the emulsion would be required.

The present invention overcomes the above-mentioned problems and provides for separation of a water-oil emulsion having solid fines dispersed therein into several parts —water and water-soluble substances, oil and oil-soluble substances, catalyst fines and, in one embodiment of my process, oil-soluble acidic materials. The separation is accomplished in a vessel which can handle product from several reactors so that equipment and operating costs are greatly lowered. As an additional advantage the invention provides for continuous separation of the reactor effluent with a continuous charge of material to be separated and continuous withdrawal of the separated constituents.

In general, my invention comprises a method of separating the constituents of a water-oil emulsion containing solid fines in which the emulsion is charged to a water-mixing zone. At the same time, a relatively large volume of water is flowed downwardly through the same water-mixing zone at a rate which is slower than the rate of gravimetric separation of the water and oil phases of the emulsion when the emulsion is broken. As a result, the emulsion is broken, the oil phase rising upwardly, and the water phase with the fines flowing downwardly to be withdrawn at the bottom of the water-mixing zone and separated in any suitable manner. The rising oil is withdrawn from the top of the water-mixing zone.

In one embodiment of my method the oil phase from the water-mixing zone rises upwardly into a caustic-mixing zone. An aqueous caustic solution is flowed downwardly through the caustic-mixing zone at a rate slower than the rate of gravimetric separation of the aqueous caustic solution and the demulsified oil phase which is rising therethrough. The rising oil is withdrawn from the upper end of the caustic-mixing zone and caustic solution and substances reacted or dissolved with the caustic are withdrawn from the lower end of the caustic-mixing zone.

In addition, my invention provides an apparatus for accomplishing the method of separation described above. The apparatus has a water-mixing section in its lower portion and a caustic-mixing section in its upper portion. These sections are separated by a caustic drawoff plate and are connected by a riser through which fluids can flow from the water-mixing section to the caustic-mixing section. The water-mixing section is provided with charge inlet means, water inlet means, and water outlet means. The caustic-mixing section is provided with caustic inlet means and oil outlet means at its upper end and caustic outlet means at its lower end.

The features and advantages of the invention will be described with reference to the accompanying drawings, of which Figure 1 shows somewhat diagrammatically and partially in section one specific form of apparatus embodying the features of the invention and in which my process may be conducted. Figure 2 shows a modification of a portion of the apparatus.

Figure 1 shows a separation vessel having a water-mixing section 1 in its lower portion and a caustic-mixing section 2 in its upper portion. The water-mixing section is characterized by a relatively large horizontal cross-sectional area for its particular volume. The two sections of the separation vessel are separated by a caustic drawoff plate 3 and are connected by an oil riser conduit 4.

The separation vessel is provided with a number of inlet and outlet lines, the proper relative positioning of which is essential for the successful operation of my process. The water-mixing section 1 is provided with charge inlet means, lines 5 and 5', and water inlet means, lines 6 and 6'. The water inlet lines for best results should be near the upper end of the water-mixing section. A conical or convex bottom in the water-mixing section, having a central outlet 7, provides means for withdrawing water and solids and conducting the mixture to suitable equipment, not shown in the drawing, where the water and solids are separated, as by decanting or filtering.

The riser 4 leading to caustic-mixing section 2 is closed at its upper end to impede the entrance of downflowing liquids from the caustic-mixing section, and has perforations 8 through which the rising oil flows into the caustic-mixing section. The caustic-mixing section is provided with a caustic inlet line 9 at its upper end and a caustic outlet line 10 at its lower end. The caustic outlet line 10 leaves the caustic-mixing section at a level below the upper end of the riser conduit 4 and just above the caustic drawoff plate 3. At the upper end of the caustic-mixing section is an oil outlet line 11 through which oil rising in the caustic-mixing section is removed. The caustic-mixing section preferably is provided with a perforated packing support 12 on which is carried suitable inert packing such as Raschig rings 13.

Figure 2 shows an alternative structure for the oil riser conduit. In this modification the water-mixing section 1 and the caustic-mixing section 2 are separated by a caustic drawoff plate 3 which is positioned at the top of a reduced diameter extension 16 of the water-mixing section 1. An oil riser conduit 17 connects the extension 16 with the caustic-mixing section 2. The water-oil interface is maintained in the extension 16 at a level below the riser 17. Riser 17 can be provided with a valve 18 for adjusting the oil flow rate through the riser. By adjusting the oil flow rate it is possible to maintain the proper level of the oil-water interface in the extension 16. Preferably, the riser 17 extends into the caustic-mixing section 2, as shown in Figure 2, and has an upturned, perforated end 19. This structure makes possible the proper dispersion of the upflowing oil phase, thereby insuring efficient contacting with the downflowing caustic solution.

The apparatus which I have described is used in my process for separating the constituents of a water-oil emulsion having solid fines dispersed therein. I will describe my separation process in connection with the separation of a particular mixture of this type, namely the condensed reactor effluent from the hydrocarbon synthesis known as the Fischer-Tropsch process. However, it should be understood that my process may be applied to any other mixture similar in composition to this reactor effluent.

When the Fischer-Tropsch process is carried out using a fluidized catalyst, the reactor effluent is a gaseous mixture of hydrocarbons, water, oxygenated organic compounds, and suspended catalyst fines. I have discovered that the constituents of this reactor effluent can best be separated by at least partially condensing the gaseous mixture and separating the uncondensed gases from the condensate. The separation of uncondensed gases from the condensate preferably is carried out in two steps. The first separation is made at essentially the reaction pressure of the synthesis process. The second separation is made at low pressure so that the subsequent demulsification of emulsion in the condensate can be performed in inexpensive equipment.

Usually a stratification of the condensate occurs with the formation of three layers, an oil layer, an emulsion layer, and a water layer. These three layers are separated as by decanting and the emulsion, containing dispersed catalyst fines, is subjected to a separation process as described below. If the emulsion separation apparatus of the invention is serving a plurality of synthesis reactors, the emulsion from the condensed effluent of these reactors is collected for charging to the apparatus.

The charge liquid containing an emulsion of hydrocarbons and water, together with oxygenated compounds and catalyst fines, is charged to a water-mixing zone such as the water-mixing section 1 of my separation vessel, via charge inlet lines 5 and 5'. In the water-mixing zone, water in a large volume relative to the volume of water in the charge emulsion is flowed downwardly. This is accomplished by maintaining the water-mixing section completely filled with liquid and continuously charging water via water inlet lines 6 and 6' while continuously removing water via water and solids outlet line 7. Upon the mixing of the charge emulsion with the relatively large volume of water, the emulsion is at least partially broken. The emulsion breaking is thought to be caused by the dilution of water-soluble emulsion-stabilizing substances which are present in the charge mixture.

The volume of water with which the emulsion must be contacted to cause demulsification will depend upon factors such as the volume of water present in the emulsion and the proportional amounts of the water-soluble and oil-soluble constituents of the emulsion, etc. Thus the minimum amount of water which must be used will vary with the specific composition of the emulsion to be treated. However, in general it can be said that a volume of fresh water which is at least about double the volume of water in the charge emulsion should be used in the process. Of course, any dilution greater than this will give excellent results.

When the charge emulsion is introduced into the water-mixing section it is obvious that the first increments of charge contacting the fresh water will be greatly diluted. However, assuming that no fresh water is being introduced, the concentration of stabilizing substances in the water-mixing section will steadily increase, approaching a limit equal to the concentration in the water of the charge emulsion. Thus, after a certain length of time there would be no dilution effect in the water-mixing section. Accordingly, before the concentration of the stabilizing substances increases substantially in the water-mixing section, the introduction of fresh water is started.

In my process, to obtain a concentration of the stabilizing substances equal to about one-third the strength of their concentration in the charge emulsion, a quantity of water equal to at least about twice that contained in the charge emulsion is introduced to the water-mixing section simultaneously with the emulsion. This means that the rate of flow of fresh water to the water-mixing section should be about twice the rate of flow of water in the charge emulsion in order to decrease the concentration of stabilizing substances sufficiently to allow the emulsion to break.

Upon breaking of the emulsion, the charge separates into its oil and water phases and the oil phase, being the less dense, rises upwardly in relation to the water phase. This separation of immiscible substances due to their differences in density will be referred to in the specification and claims as "gravimetric separation." The rate at which the substances separate or, in other words, the linear velocity at which the oil rises relative to the water will be referred to as the "rate of gravimetric separation."

The proper balancing of flow rates in the process causes an oil-water interface to appear at a level which can be regulated by adjusting the flow rates. The oil-water interface preferably is maintained at a high level in the water-mixing section so that oil particles moving upwardly are counter-currently scrubbed with fresh water moving downwardly.

The water-mixing section and the caustic-mixing section of my separation apparatus must each be maintained completely filled with liquid so that the demulsified oil phase will float upwardly and pass overhead from the separation apparatus. The linear rate of downward flow of water in the water-mixing section 1 must be slower than the linear rate of gravimetric separation of the oil and water phases of the charge in order that the oil will rise from the water-mixing zone and not to be carried downwardly with the water. The same principle applies to the rate of downward flow of caustic solution in the caustic-mixing section. The proper balancing of these rates of flow is accomplished by adjusting the flow rates in the different inlet and outlet lines so as to cause the oil to flow upwardly and overhead from the column and the water and caustic to flow downwardly.

As shown in the drawing, I employ a water-mixing section having in relation to its particular volume a large horizontal cross-sectional area. This makes it possible for the water-mixing section to handle a large volume flow rate of water and emulsion while also affording the low linear flow rates which are necessary in order to obtain separation of the water and oil phases of the charge. The height of the water-mixing section is controlled by the fact that the rising oil must be subjected to a sufficiently long period of countercurrent scrubbing.

In the simplest form of my process the oil rising from the water-mixing zone carrying with it the oil-soluble constituents of the charge, including oil-soluble acidic substances, is withdrawn as product without further treatment in the separation vessel described herein. The water which flows downwardly in the water-mixing zone passes into a sedimentation pool not shown in the drawing where fines are settled and the water is decanted. When the process is conducted in this manner the charge is separated into three parts, namely, hydrocarbons and oil-soluble substances, water and water-soluble substances, and catalyst fines.

In another embodiment of my process I separate the charge into four parts. In such case, the oil rising from the water-mixing zone is subjected to a further treatment in a caustic-mixing zone. In this further treatment I take advantage of the fact that an aqueous caustic solution such as a dilute solution of sodium hydroxide has a demulsifying effect on residual emulsion carried from the water-mixing zone with the oil and also reacts with acidic materials forming water-soluble salts that separate from the oil. Thus, in this embodiment of my process the oil rising from the water-mixing zone is flowed upwardly into a caustic-mixing zone and an aqueous solution of caustic is flowed downwardly through the same zone at a rate slower than the rate of gravimetric separation of the caustic solution and the demulsified oil layer rising therethrough. Oil is withdrawn from the top of this caustic-mixing zone while caustic solution and substances reacted with the caustic are removed from the bottom of the caustic-mixing zone.

The caustic-mixing section treats only a portion of the charge which enters the water-mixing section. Also the density differential of the liquids in the caustic mixing section (oil and aqueous caustic solution) is greater than the density differential of the liquids in the water-mixing section (emulsion and water), and hence the rate of gravimetric separation is greater in the caustic-mixing section. Therefore, its cross-sectional area can be correspondingly smaller than that of the water-mixing section while at the same time affording the desired low linear velocities of the liquid. On the other hand, the oil rising in the caustic section should be subjected to a more efficient scrubbing action than the oil rising in the water-mixing section since fairly intimate contact will be required to effectively remove the acidic constituents. Therefore, the caustic-mixing section preferably is of a height sufficient for the caustic-oil interface to be maintained a distance above the oil inlet which will afford the desired countercurrent scrubbing action.

An aqueous solution of caustic is charged via line 9 to the caustic-mixing section 2 and is caused to flow downwardly by withdrawal of caustic through caustic outlet 10 located slightly above the caustic drawoff plate 3 and below the upper end of the riser conduit 4. The oil which is immiscible with the aqueous caustic solution flows upwardly in the caustic-mixing section which is completely filled with liquid and preferably is at least partly packed with an inert packing material such as Raschig rings 13, the purpose of which is to provide adequate contact surface so that all portions of the rising oil layer are contacted and scrubbed by the countercurrently flowing caustic. Residual emulsion in the rising oil is broken by the contact with caustic, and acidic materials rising with the oil react to form water-soluble organic salts which flow downwardly with the caustic solution. The downwardly flowing liquid collects on the drawoff plate 3 from which it is withdrawn through caustic outlet 10. The oil composed of hydrocarbons and non-acidic oil-soluble materials floats upwardly through the liquid-filled column and passes out through oil outlet 11. In this way I obtain a separation of the reactor effluent into four parts, namely, water and water-soluble materials, hydrocarbons and oil-soluble materials, acidic materials, and catalyst fines.

A specific example of one method of conducting my process on a commercial scale is described below.

*Example*

The charge emulsion is a typical condensed reactor effluent from a fluid catalyst Fischer-Tropsch process containing hydrocarbons and water in the ratio of about 1.4 barrels of water per barrel of hydrocarbons, about 110 pounds of oxygenated compounds per barrel of hydrocarbons, and about 0.3 pound of catalyst fines per barrel of hydrocarbons. The oxygenated compounds are in two classes, water-soluble compounds and oil-soluble compounds. The water-soluble compounds are alcohols such as methanol, ethanol, isopropanol, etc.; aldehydes such as acetaldehyde, propionaldehyde and butyraldehyde; ketones such as acetone, methyl ethyl ketone, etc.; and acids such as acetic, propionic, butyric, and valeric. The oil-soluble oxygenated compounds are alcohols, aldehydes, ketones and acids of generally higher molecular weight than the corresponding types of water-soluble oxygenated compounds. The ratio of water-soluble oxygenated compounds to oil-soluble oxygenated compounds is about 2.6:1 by weight. This emulsion is charged by two charge inlet lines to a separation vessel of the type illustrated in the drawing. The cylindrical water-mixing section of said vessel is about 10 feet in diameter and 10 feet in height. The caustic-mixing section is about 3 feet in diameter and 18 feet in height and is packed with 1-inch carbon Raschig rings through about 10 feet of its height. At the start of the process, the water-mixing section is completely filled with water and the caustic-mixing section is completely filled with a 10 per cent aqueous solution of sodium hydroxide. The emulsion and fresh water are charged to the water-mixing section by the charge and water inlets and water is withdrawn from the water-mixing section by the water outlet at rates which, for the water-mixing section of the particular dimensions described, cause a downward flow of water at a linear rate slower than the linear rate of gravimetric separation of the oil and water phases. The oil phase therefore rises in the vessel. Since the charge inlet is below the level of the oil-water interface, each increment of the rising oil is thoroughly water-scrubbed as it rises upwardly through the continuous water phase. The proper emulsion charge rate for this particular water-mixing section is 170 gallons per minute via each charge inlet or a total of 340 gallons per minute. Since the emulsion contains about 200 gallons of water per 340 gallons, the fresh water is charged to the water-mixing section by two water inlet lines at a rate of about 400 gallons per minute each, or a total of 800 gallons per minute, in order to dilute the emulsion in the proper degree. In this particular example the emulsion is diluted in the ratio of about 4 to 1. Water and water-soluble substances are withdrawn from the bottom of the water-mixing section together with catalyst fines and pass to a sedimentation vessel at a rate equal to the total of the water inlet rates, or 1000 gallons per minute plus the rate of introduction of water-soluble substances in the charge emulsion. Oil rising from the water-mixing section enters the caustic-mixing section via the oil riser conduit at a rate of 140 gallons per minute plus 100 pounds per minute of oil-soluble oxygenated compounds. A 10 per cent sodium hydroxide solution is charged to the caustic-mixing section at a rate of about 100 gallons per minute and is withdrawn by the caustic outlet at a rate of about 100 gallons per minute together with organic salts formed by the reaction of the caustic with 100 pounds per minute of oil-soluble acidic materials. The oil product containing hydrocarbons and non-acidic, oil-soluble oxygenated compounds is withdrawn overhead from the caustic-mixing section at a rate of about 140 gallons per minute.

From the foregoing description it can be seen that my invention provides a method and apparatus for continuously separating the constituents of a water-oil emulsion having acidic materials and solid fines therein. The invention is particularly adapted for the separation of the product from a Fischer-Tropsch fluid catalyst process and can handle the product from a plurality of reactors so that great savings in equipment are obtained over the previously proposed processes for separating such product. While particularly adapted for the separation of the Fischer-Tropsch reaction product, my invention is also applicable to the separation of any mixture having the characteristics of such a product, i. e., a mixture containing an emulsion of water-soluble and oil-soluble materials together with solid fines which tend to stabilize the emulsion.

Obviously many modifications of the invention as hereinbefore set forth may be made without departing from the spirit and scope thereof, and therefore only such limitations should be imposed as are indicated in the appended claims.

I claim:

1. A method of separating the constituents of the gaseous reactor effluent from a fluidized catalyst Fischer-Tropsch type hydrocarbon synthesis which comprises at least partially condensing said gaseous reactor effluent, separating uncondensed gases from the condensate, obtaining from said condensate a water-oil emulsion having catalyst fines heavier than water dispersed therein, charging such emulsion to a water-mixing zone, flowing a relatively large volume of water downwardly through said water-mixing zone at a linear rate slower than the linear rate of gravimetric separation of the water and oil phases of said emulsion on the resolving of said emulsion, whereby said emulsion is broken with the oil phase rising upwardly and the fines flowing downwardly with the water, withdrawing fines and water from the bottom of said water-mixing zone, and withdrawing oil rising through said water-mixing zone from the top of said zone.

2. A method of separating the constituents of the gaseous reactor effluent from a fluidized catalyst Fischer-Tropsch type hydrocarbon synthesis which comprises at least partially condensing said gaseous reactor effluent, separating uncondensed gases from the condensate, obtaining from said condensate a water-oil emulsion having catalyst fines heavier than water dispersed therein, charging such emulsion to a water-mixing zone, flowing a relatively large volume of water downwardly through said water-mixing zone at a linear rate slower than the linear rate of gravimetric separation of the water and oil phases of said emulsion on the resolving of said emulsion, whereby said emulsion is broken with the oil phase rising upwardly into a caustic-mixing zone and the fines flowing downwardly with the water, withdrawing fines and water from the bottom of said water-mixing zone, flowing an aqueous caustic solution downwardly through said caustic-mixing zone at a linear rate slower than the linear rate of gravimetric separation of said aqueous caustic solution and the demulsified oil phase rising therethrough, withdrawing oil rising through said caustic-mixing zone from the top of said zone and withdrawing caustic solution and substances reacted therewith from the bottom of said caustic-mixing zone.

References Cited in the file of this patent

UNITED STATES PATENTS

| Number | Name | Date |
|---|---|---|
| 1,159,044 | Kelly | Nov. 2, 1915 |
| 1,830,925 | Brewster | Nov. 10, 1931 |
| 1,948,481 | Turner | Feb. 20, 1934 |
| 2,009,510 | Mobley | July 30, 1935 |
| 2,143,190 | Fisher et al. | Jan. 10, 1939 |
| 2,384,222 | Walker | Sept. 4, 1945 |
| 2,409,005 | Webber | Oct. 8, 1946 |
| 2,410,970 | Guyer | Nov. 12, 1946 |
| 2,440,617 | Seebold | Apr. 27, 1948 |
| 2,447,530 | Perkins | Aug. 24, 1948 |
| 2,566,980 | Catanach et al. | Sept. 4, 1948 |